(12) United States Patent
Mao

(10) Patent No.: US 11,449,357 B2
(45) Date of Patent: Sep. 20, 2022

(54) CONFIGURABLE INTEGRATED CIRCUIT TO SUPPORT NEW CAPABILITY

(71) Applicant: SK hynix Inc., Gyeonggi-do (KR)

(72) Inventor: Jinliang Mao, Milpitas, CA (US)

(73) Assignee: SK hynix Inc., Gyeonggi-do (KR)

( * ) Notice: Subject to any disclaimer, the term of this patent is extended or adjusted under 35 U.S.C. 154(b) by 492 days.

(21) Appl. No.: 16/681,471

(22) Filed: Nov. 12, 2019

(65) Prior Publication Data

US 2020/0151000 A1 May 14, 2020

Related U.S. Application Data

(60) Provisional application No. 62/760,107, filed on Nov. 13, 2018.

(51) Int. Cl.
*G06F 9/46* (2006.01)
*G06F 9/38* (2018.01)
*G06F 12/02* (2006.01)
*G06F 13/12* (2006.01)
*G06F 13/10* (2006.01)

(52) U.S. Cl.
CPC ............ *G06F 9/468* (2013.01); *G06F 9/3838* (2013.01); *G06F 9/3851* (2013.01); *G06F 12/0246* (2013.01); *G06F 13/102* (2013.01); *G06F 13/12* (2013.01)

(58) Field of Classification Search
CPC ........................................................ G06F 9/468
See application file for complete search history.

(56) References Cited

U.S. PATENT DOCUMENTS

| 9,146,890 | B1 * | 9/2015 | Brown ................ G06F 13/4022 |
| 2007/0043882 | A1 | 2/2007 | Natarajan et al. |
| 2011/0258352 | A1 * | 10/2011 | Williams .............. G06F 13/385 |
| | | | 710/308 |
| 2016/0371208 | A1 * | 12/2016 | Rosenberg .......... G06F 13/4282 |

* cited by examiner

*Primary Examiner* — David E Martinez
(74) *Attorney, Agent, or Firm* — IP & T Group LLP

(57) ABSTRACT

Enabling an integrated circuit (IC) to accommodate a new peripheral component interconnect express (PCIe) capability of an updated PCIe specification. Firmware-programmable registers for the IC, spanning a target range of register and function numbers to accommodate the new capability, are created. A host issues configuration requests to the IC, which include a register and function number for the new capability. The IC returns a value of a target register when the register number and function number are in the target range. The host updates the value and triggers a firmware interrupt to add the new capability to a list of existing capabilities.

14 Claims, 6 Drawing Sheets

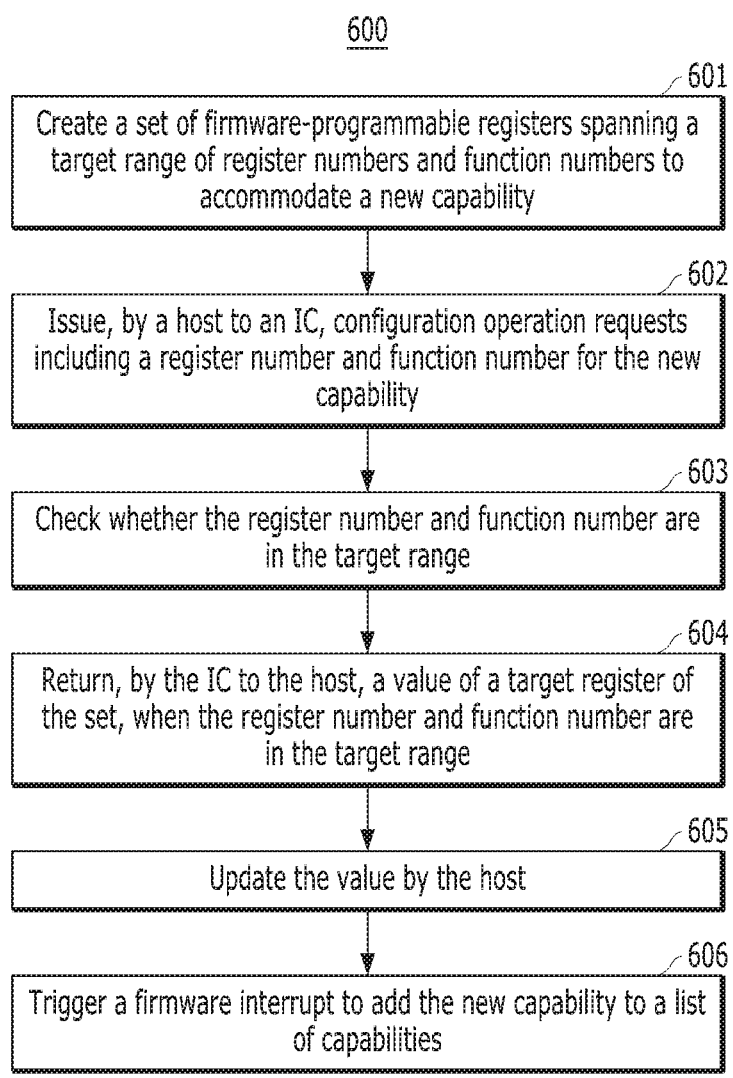

CONFIGURABLE INTEGRATED CIRCUIT TO SUPPORT NEW CAPABILITY

CROSS-REFERENCE TO RELATED APPLICATION

This application claims the benefit of U.S. Provisional Application No. 62/760,107, filed on Nov. 13, 2018, the entire contents of which are incorporated herein by reference.

BACKGROUND

1. Field

Embodiments of the present disclosure relate to an integrated circuit (IC) that is configurable to support new capabilities, which may be required by a new or updated specification of a device, of which the IC is a component.

2. Description of the Related Art

The computer environment paradigm has shifted to ubiquitous computing systems that can be used anytime and anywhere. As a result, the use of portable electronic devices, such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices used as memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. A NAND-type flash memory may be written to and read from in blocks (or pages) which are generally much smaller than the entire memory space. A NAND-type flash memory operates primarily in memory cards, USB flash drives, solid-state drives (SSDs), and similar products, for general storage and transfer of data.

The controller of a data storage device, which may be integrated therewith as noted above, typically has a host interface that communicates with a host device through an interface protocol, e.g., peripheral component interconnect express (PCIe). Such protocol is defined by a specification that changes from time to time. A newer version of the specification may incorporate newer capabilities, which may require new logic for proper execution.

In this context embodiments of the present invention arise.

SUMMARY

Embodiments of the present invention provide a configurable integrated circuit (IC) that is able of supporting new capabilities, which may be required by new or updated device specifications of which the IC is a component.

An aspect of the present invention entails methods for configuring an integrated circuit with a new capability. One such method comprises creating a set of firmware-programmable registers for the integrated circuit, the set of registers spanning a target range of register numbers and function numbers to accommodate a new capability; issuing configuration operation requests, by a host, to the integrated circuit, the configuration operation requests including a register number and function number for the new capability; checking whether the register number and the function number are in the target range; returning, by the integrated circuit to the host, a value of a target register of the set, when the register number and function number are in the target range; updating the value by the host; and triggering a firmware interrupt to add the new capability to a list of existing capabilities.

Another aspect of the present invention includes a system for enabling a new capability for an endpoint core. The system comprises a firmware capability module that defines a register space for the new capability; and a root complex that configures write and read transactions with the endpoint core, including issuing a register number and a function number for the new capability. The endpoint core is configured to check whether the register number and the function number are within the register space, and return to the root complex, a value of a target register within the register space. The root complex is further configured to update the value, and trigger a firmware interrupt to add the new capability to a list of existing capabilities.

Further aspects of the present invention include methods for adding a new capability to a peripheral component interconnect express (PCIe) controller that presently implements multiple capabilities pointed to by respective host addresses, the last of the capabilities pointing to null. One such method comprises reprogramming, with firmware, one of the multiple capabilities to point to a new address within an address range defined by the host addresses; programming, with the firmware, a newly defined register value associated with the new address in accordance with a specification of the new capability; programming bits to define multiple conditions with the firmware; programming a target function to correspond to a physical function with the firmware; and enabling a configuration space for host access to perform a configure read and write operation and update the register value of the new capability.

Additional aspects of the present invention will become apparent from the following description.

BRIEF DESCRIPTION OF THE DRAWINGS

FIG. 6 is a flow chart illustrating steps for enabling an IC to support a newly defined capability in accordance with embodiments of the present invention.

DETAILED DESCRIPTION

Figure 1:
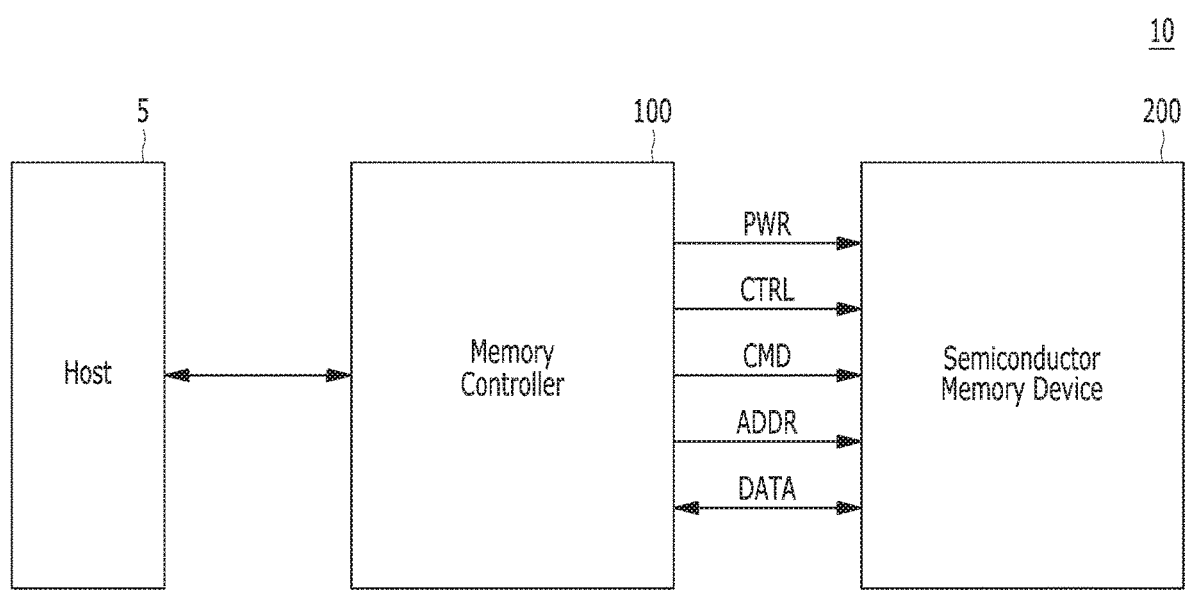
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type. For brevity, memory controller 100 is sometimes referred to simply as controller 100, and semiconductor memory device 200 is sometimes simply referred to as memory device 200. A host device 5 may be coupled to the memory system 10, as shown in FIG. 1.

The memory controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the memory system 10 is used in an SSD, operation speed of the host 5 coupled to the memory system 10 may remarkably improve.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
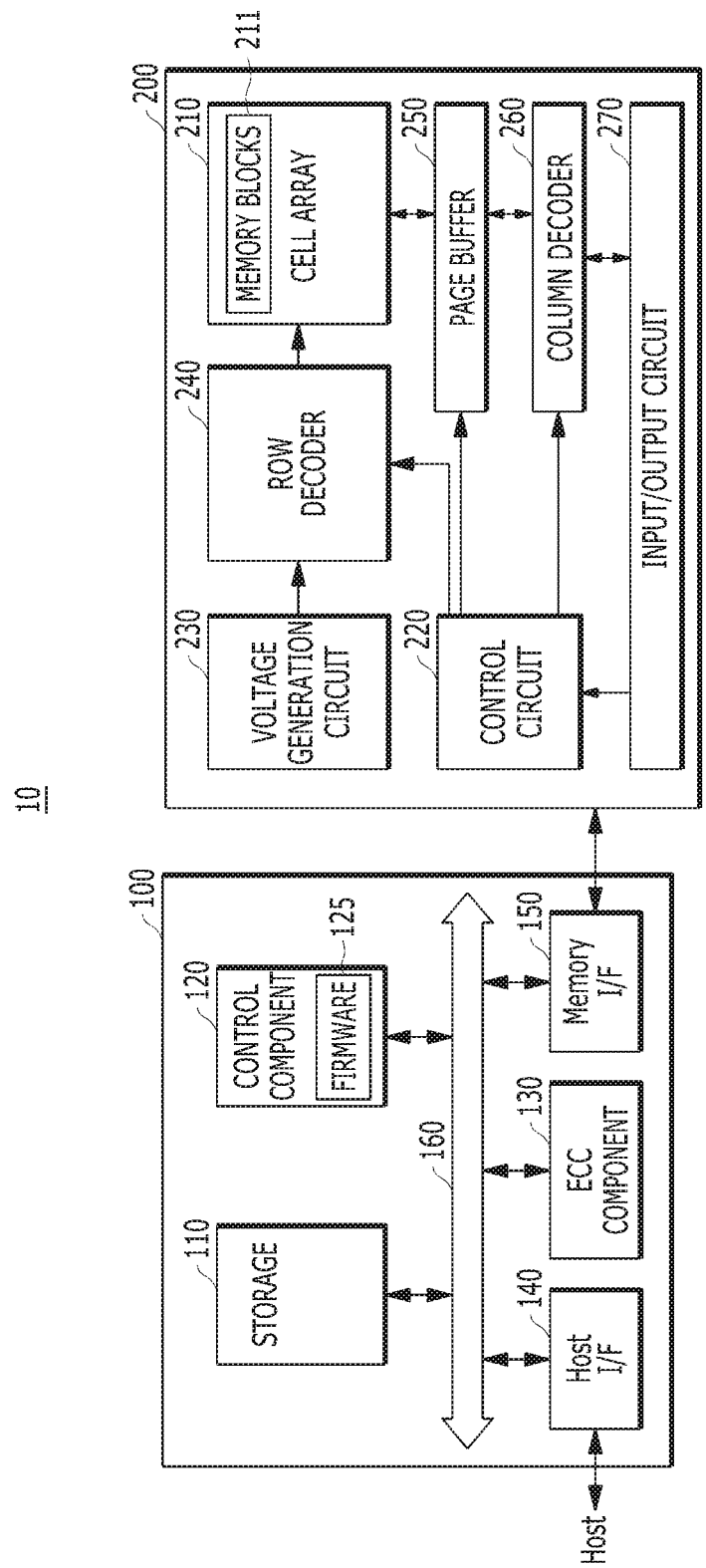
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, e.g., host 5 of FIG. 1, and in particular, store data to be accessed by the host device.

The host device 5 may be implemented with any one of various kinds of electronic devices. In some embodiments, the host device 5 may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device 5 may include a portable electronic device, such as a mobile phone, a smart phone, an e-book, an MP3 player, a portable multimedia player (PMP), and/or a portable game player.

The memory device 200 may store data to be accessed by the host device 5.

The memory device 200 may be implemented with a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device 5. The controller 100 may provide data read from the memory device 200 to the host device 5, and may store data provided from the host device 5 into the memory device 200.

The controller 100 may include a storage 110, a control component 120, which may be implemented as a processor, e.g., a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) and/or a dynamic random access memory (DRAM).

As described above, the storage 110 may store data used by the host device 5 in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device 5. The control component 120 may drive firmware 125 to control general operations of the memory system 10. The firmware 125 may be in the form of a flash translation layer (FTL), which may perform operations, such as logical-to-physical (L2P) mapping, wear leveling, garbage collection, and/or bad block handling. The L2P mapping is known as logical block addressing (LBA). The firmware 125 may also be used to enable a newly defined capability for an integrated circuit (IC) as explained below.

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a block coded modulation (BCM).

The host interface 140 may communicate with the host device 5 through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE). The present invention is described in the context of PCIe, but the present invention is not limited to PCIe. The principles are applicable to other protocols including those identified above.

The memory interface 150 may provide an interface between the controller 100 and the memory device 200 to allow the controller 100 to control the memory device 200 in response to a request from the host device 5. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
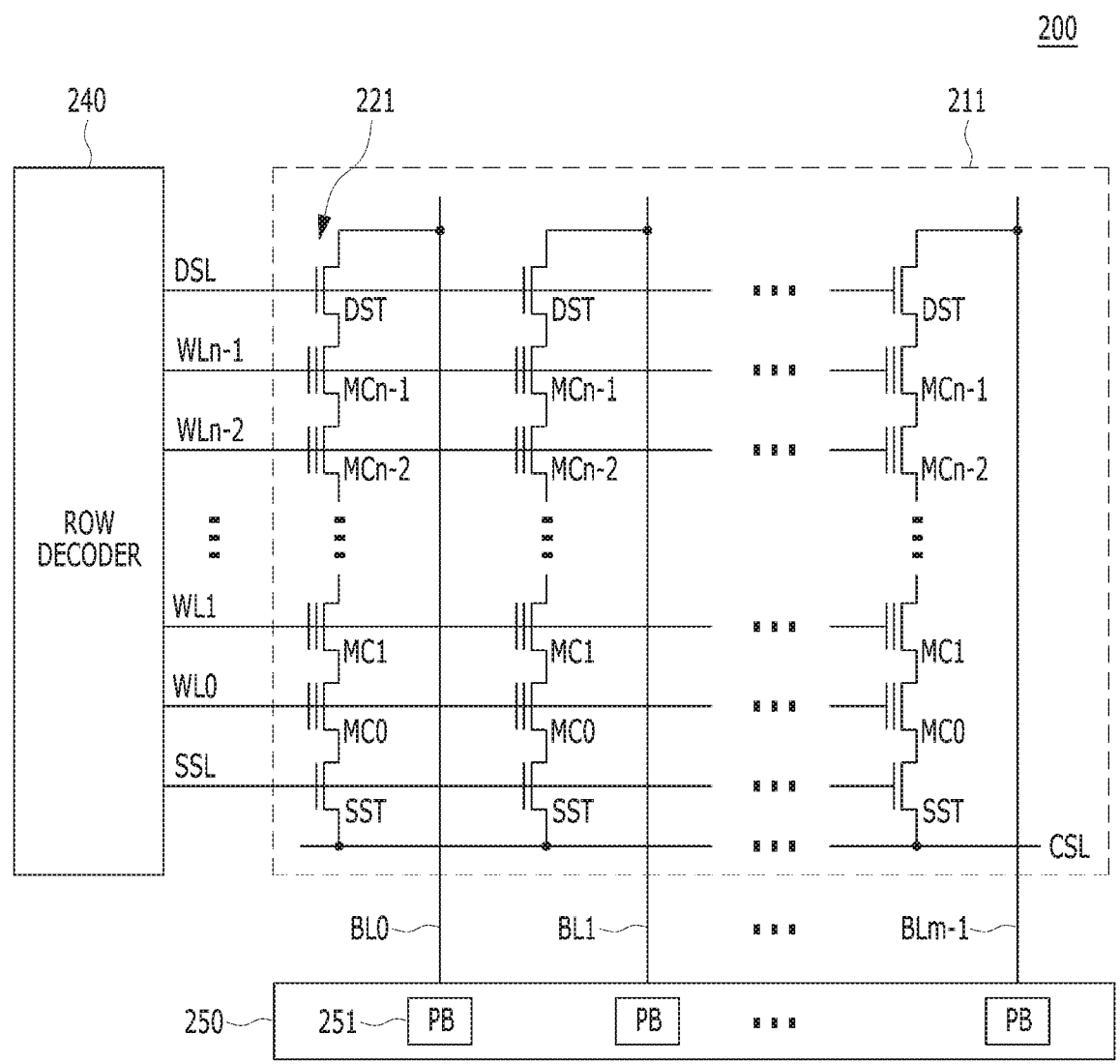
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As previously noted, specifications defining various protocols, e.g., communication protocols, change from time-to-time. Such change often entails new capabilities based on developments of the components of devices that operate under the protocol. These new capabilities often involve new logic. However, any existing component, such as an IC or application specific integrated circuit (ASIC) does not typically support new capabilities. In the discussion that follows, IC is intended to include ASIC.

Thus, the present invention provides techniques to make an IC capable of supporting new capabilities without the need to re-spin the IC. In doing so, the present invention advantageously saves time and resources.

Generally, the techniques involve creating new register ranges for the target IC, i.e., the IC being configured. For the newly created register ranges, firmware FW is executed to fill in an initial value for each register, as well as for setting read, write and reserved permissions. A host, e.g., host device 5, is able to read from, and write to, each of these registers, just like it can for existing registers for existing capabilities. After the host 5 writes new values, the host 5 triggers an interrupt to the firmware to allow the firmware to properly match the requirements of the new capabilities.

Figure 4:
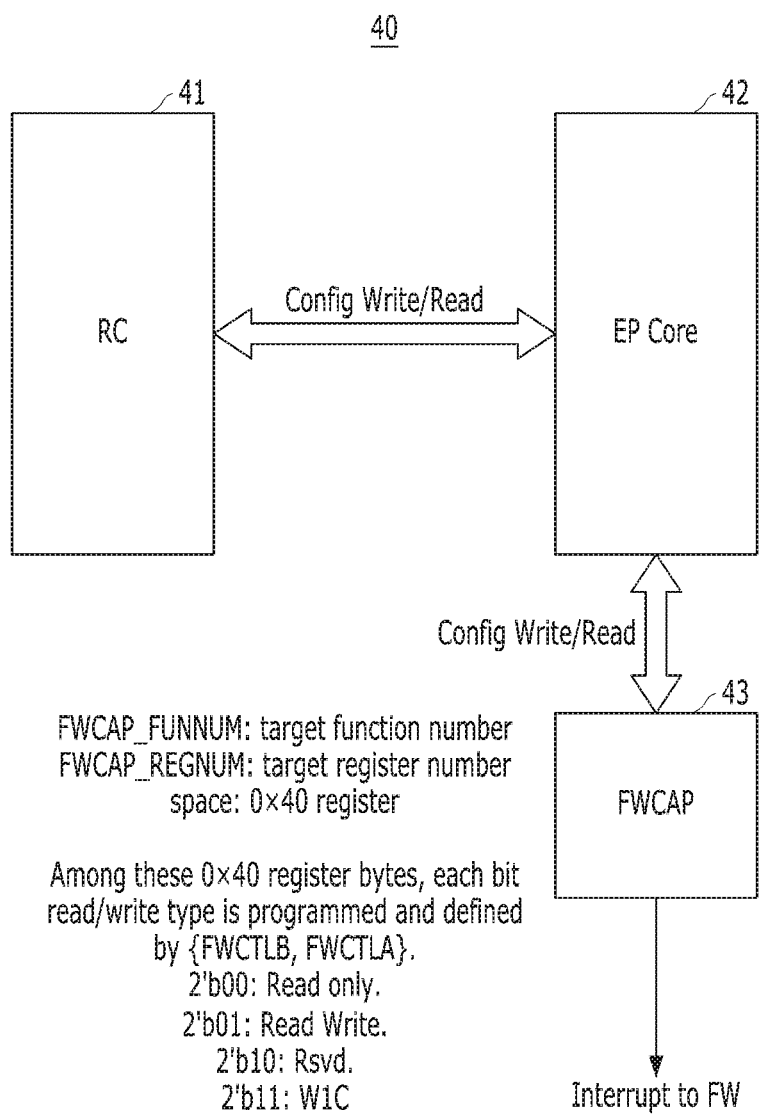
FIG. 4 is a schematic diagram illustrating peripheral component interconnect express (PCIe) topology in accordance with an embodiment of the present invention.

Referring to FIG. 4, an example of peripheral component interconnect express (PCIe) topology 40 is illustrated. A root complex (RC) 41 is in communication with an end point (EP) core 42 to configure read and write capabilities. The RC 41 and EP core 42 may correspond to a PCIe host and IC (or ASIC) respectively. A firmware capability (FWCAP) module 43 to define FW capabilities is in communication with the EP core 42 to configure read and write capabilities. The FWCAP module 43 issues the interrupt to the firmware (FW) in response to the interrupt trigger from the host 5.

As shown in FIG. 4, an IC 42, e.g., ASIC, implements a set of registers, which are firmware (FW) programmable. In the illustrated embodiment, the register space is 0x40, which implements up to 16 capabilities (one capability which is at least 1DW) and is accessible by the PCIe host, e.g., RC 41. However, the actual number of capabilities depends on specification. One capability is normally 3DW or 4DW, and the minimum is 1DW (32 bits).

To support read-only/RW/reserved register bit permission, another two groups of registers FWCTLB, FWCTLA are created. When corresponding FWCTLB[i] and FWCTLA[i]=2'b00, that defines read only (RO) to the PCIe Host. 2'b01 means read/write (RW). 2'b10 means reserved (Rsvd or RSVD). 2'b11 means read and write one to clear (RW1C).

When the PCIe Host 41, issues configuration read/write transactions to the IC 42, the configuration read/write cycles also reach these firmware-controllable registers. The logic checks if a target register number and target function number lies in desired range. If so (hit), the value is returned to the PCIe host 41. If not, no response or zero data is returned to the PCIe host 41.

After the PCIe host 41 configures writes and updates the value for the particular firmware-controllable register, the logic may trigger an interrupt to the firmware for it to take proper action to achieve the specification requirement for this newly added capability of the IC 42.

The defined register space should only respond properly to an expected register number and function number. The exact register number will be firmware programmable. If the firmware program targets a register number to be 0x600 (REGBASE), then the register number inside 0x600 to 0x63F will provide a proper response.

Logic determines whether an incoming register number is larger than the register base (REGBASE) but less than REGBASE+0x40. If so, the logic will return the register value to the PCIe host 41. If not, zero data is returned to the PCIe host 41. System design determines how to make zero data return possible.

Function number check is especially important for a multi-function device or Single Root I/O virtualization (SRIOV) device. The logic can have the option to program one target function number or several function numbers, or one bit to enable all functions to be targeted. In an SRIOV device, some capabilities are shared among the physical function driver (PF) and all of the virtual function drivers (VFs). The enable all of functions feature is useful in this case.

PCIe defines multiple register types. Classifying the registers into 4 types (RO, RW, RW1C, RSVD) is sufficient to meet most requirements. It is important for an RO bit, that the logic ensures that a configure write of the PCIe host 41 will not change the register value. For an RW1C bit, the logic has to make sure that a host configure read write will achieve the expected effect.

With two bits for permission control, and incoming configure read/write transaction bit, write data, it is fairly straightforward to implement host access permission. More complicated types could be implemented as well, as those skilled in the art will appreciate.

After writing the capability bits, the PCIe host 41 informs the firmware, so that firmware can take proper action as required by the specification of the IC 42. This extends the capability of the registers.

For firmware controllable capability, more complicated hardware action is not practical to achieve (unless using programmable logic style which means larger gate count and timing requirement). Firmware action is much more flexible and easy to implement. Logic can create mask bits to allow which register bits' change triggers interrupt.

FIG. 4 indicates that there are 64 registers that are programmable. This number can be increased or decreased based on design considerations.

Figure 5:
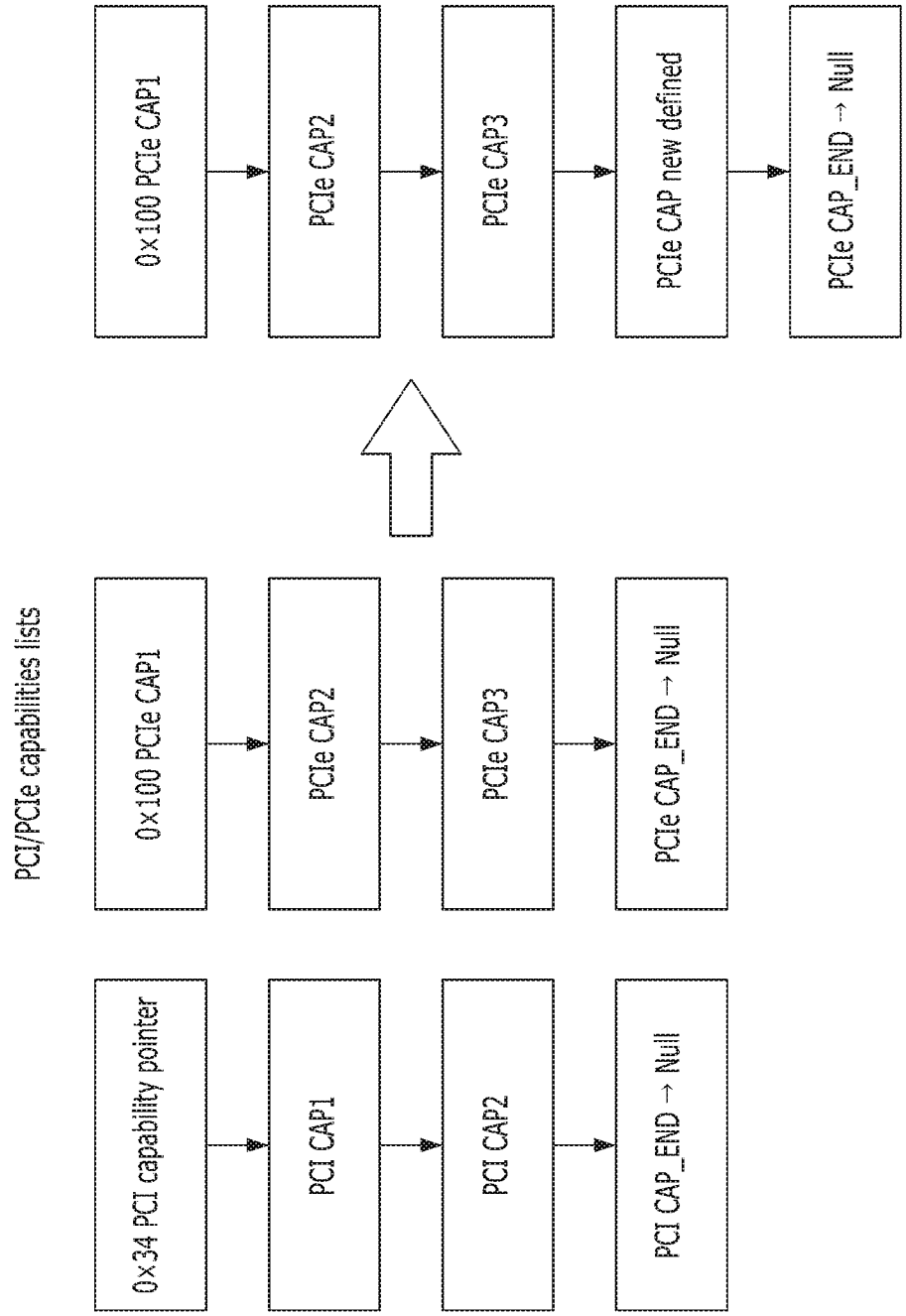
FIG. 5 illustrates linking of PCI/PCIe capabilities and enabling an integrated circuit (IC) to support a newly defined capability in accordance with an embodiment of the present invention.

FIG. 5 shows an example of PCI/PCIe capabilities lists. All capabilities should be chained together. The first PCIe capability may be from 0x100, and the last capability is Null. After implementing this firmware capability, the firmware programs the 'next pointer' of the previous capability to be REGBASE. For example, in FIG. 5, PCIe CAP3's next pointer is REGBASE. And the next pointer of the newly defined firmware controllable capability is PCIe CAP_END.

Referring to FIG. 5, as an example, assume that the PCIe controller, which may be an embodiment of controller 100 in FIGS. 1 and 2, already implements PCIe CAP1, PCIe CAP2, PCIe CAP3, and PCIe CAP_END. PCIe CAP1 is pointed to by 0x100, PCIe CAP2 is pointed to by 0x200, PCIe CAP3 is pointed to by 0x300, and PCIe CAP_END is pointed to by 0x900, which is pointing to Null. Without a new defined firmware capability, PCIe CAP3's next pointer is 0x900, which is CAP_END.

In accordance with embodiments of the present invention, firmware is employed to enable a newly defined capability, accessed by host address 0x600.

The firmware programs PCIe CAP3's next pointer to be 0x600.

The firmware programs the PCIe CPA 'new defined' register value as the specification requires.

The firmware programs FWCTLB and FWCTLA bits so that some bits are RO, some RW, some RW1C, and some reserved.

The firmware programs the targeting function to be 0 so that only physical function has this capability.

After above steps, the firmware enables a configure space for host access.

During enumeration, the host 41 finds that PCIe CAP3's next capability is 0x600. Moreover, the capability content is the new defined capability. The next pointer of PCIe new defined is CAP_END.

The host 41 takes appropriate action on this new defined capability and does configure read/write. The register value will change accordingly. An interrupt is sent to the firmware. As a result, the firmware is aware of the new capability content update and takes appropriate actions based on the specification requirement.

FIG. 6 is a flow chart describing steps of configuring an integrated circuit with a new capability, in accordance with embodiments of the present invention. The steps shown in flow chart 600 are exemplary. Those skilled in the art will understand that additional and/or alternative steps may be performed, or that the order of steps may be changed, to effectuate aspects of the present invention without departing from the inventive concepts disclosed herein. FIG. 6 is described with reference to other figures, particularly FIGS. 4 and 5.

Referring to FIG. 6, at step 601, a set of firmware-programmable registers are created to accommodate a new capability. Such registers span a target range of register numbers and function numbers. Then, at step 602, the RC 41, e.g., host, issues configuration operation requests to the EP 42, e.g., IC. Such requests may be configuration write and read requests. The requests include a register number and function number for the new capability. The EP 42 checks whether the register number and function number are in the target range at step 603. If so, the EP 42 returns to the RC 41 a value of a target register of the set at step 604. Then, at step 605, the value is updated by the RC 41. At step 606, a firmware interrupt is issued to enable the firmware to add the new capability to a list of capabilities.

As the foregoing demonstrates, embodiments of the present invention provide a configurable IC, such as an ASIC, that is capable of supporting added capabilities without having to re-spin the IC. This saves a lot of resources.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for configuring an integrated circuit with a new capability, the method comprising:
   creating a set of firmware-programmable registers for the integrated circuit, the set of registers spanning a target range of register numbers and function numbers to accommodate a new capability;
   issuing configuration operation requests, by a host, to the integrated circuit, the configuration operation requests including a register number and function number for the new capability;
   checking whether the register number and the function number are in the target range;
   returning, by the integrated circuit to the host, a value of a target register of the set, when the register number and function number are in the target range;
   updating the value by the host; and
   triggering a firmware interrupt to add the new capability to a list of existing capabilities.

2. The method of claim 1, wherein the set of registers includes multiple register types.

3. The method of claim 2, wherein the multiple register types include read/write (RW), read-only (RO), read/write 1 to clear (RW1C) and reserved (RSVD).

4. The method of claim 1, wherein the updating further includes setting permissions for the target register.

5. The method of claim 4, wherein the permissions include read, write and reserved permissions.

6. A system for enabling a new capability for an endpoint core, the system comprising:
- a firmware capability module that defines a register space for the new capability;
- a root complex that configures write and read transactions with the endpoint core, including issuing a register number and a function number for the new capability;
- the endpoint core being configured to check whether the register number and the function number are within the register space, and return to the root complex, a value of a target register within the register space;
- the root complex being further configured to update the value, and trigger a firmware interrupt to add the new capability to a list of existing capabilities.

7. The system of claim 6, wherein the root complex is a peripheral component interconnect express (PCIe) host, and the endpoint core is an application specific integrated circuit (ASIC).

8. The system of claim 6, wherein the register space includes multiple register types.

9. The system of claim 8, wherein the multiple register types include read/write (RW), read-only (RO), read/write 1 to clear (RW1C) and reserved (RSVD).

10. The system of claim 6, wherein the update operation further includes setting read, write and reserved permissions for the target register.

11. A method for adding a new capability to a peripheral component interconnect express (PCIe) controller that presently implements a plurality of capabilities pointed to by respective host addresses, the last of the plurality of capabilities pointing to null, the method comprising:
- reprogramming, with firmware, one of the plurality of capabilities to point to a new address within an address range defined by the host addresses;
- programming, with the firmware, a newly defined register value associated with the new address in accordance with a specification of the new capability;
- programming bits to define multiple conditions with the firmware;
- programming a target function to correspond to a physical function with the firmware; and
- enabling a configuration space for host access to perform a configure read and write operation and update the register value of the new capability.

12. The method of claim 11, further comprising issuing an interrupt to the firmware.

13. The method of claim 12, further comprising matching the new capability with the specification of the new capability.

14. The method of claim 11, wherein the programming of bits to define multiple conditions comprises programming a first set of bits to define read only (RO), a second set of bits to define read/write (RW), a third set of bits to define write one to clear (RW1C), and a fourth set of bits to define reserved (RSVD).

* * * * *